United States Patent
Mayer et al.

(10) Patent No.: US 9,152,941 B2
(45) Date of Patent: Oct. 6, 2015

(54) SYSTEMS AND METHODS FOR AUTOMATED PARALLELIZATION OF BACK-ORDER PROCESSING

(75) Inventors: Thomas A. Mayer, Leimen (DE); Hans-Ulrich Von Helmolt, Heidelberg (DE)

(73) Assignee: SAP SE, Walldorf (DE)

( * ) Notice: Subject to any disclaimer, the term of this patent is extended or adjusted under 35 U.S.C. 154(b) by 2151 days.

(21) Appl. No.: 11/246,220

(22) Filed: Oct. 11, 2005

(65) Prior Publication Data

US 2007/0094098 A1 Apr. 26, 2007

(51) Int. Cl.
*G06Q 10/08* (2012.01)
*G06Q 10/06* (2012.01)
*G06Q 20/20* (2012.01)
*G06Q 30/06* (2012.01)

(52) U.S. Cl.
CPC .............. *G06Q 10/087* (2013.01); *G06Q 10/06* (2013.01); *G06Q 10/08* (2013.01); *G06Q 20/203* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 6,567,786 B1 * | 5/2003 | Bibelnieks et al. | 705/14 |
| 6,915,211 B2 * | 7/2005 | Kram et al. | 702/5 |
| 2002/0128919 A1 * | 9/2002 | Rime et al. | 705/26 |
| 2002/0133387 A1 * | 9/2002 | Wilson et al. | 705/8 |
| 2003/0050865 A1 * | 3/2003 | Dutta et al. | 705/27 |
| 2003/0110104 A1 * | 6/2003 | King et al. | 705/28 |
| 2005/0065828 A1 * | 3/2005 | Kroswek et al. | 705/7 |
| 2005/0197921 A1 * | 9/2005 | Abo-Hasna et al. | 705/26 |
| 2008/0027825 A1 * | 1/2008 | Boonie et al. | 705/26 |
| 2008/0140688 A1 * | 6/2008 | Clayton et al. | 707/100 |

* cited by examiner

*Primary Examiner* — Asfand Sheikh
(74) *Attorney, Agent, or Firm* — Dilworth IP LLC

(57) ABSTRACT

Systems, methods, and computer-readable media provide mechanisms to determine the availability of one or more order items within a supply chain environment. In one embodiment, the method may comprise defining a profile to be associated with an availability check, wherein the availability check consists of a filter process, a sort process, a prepare process, a check process, and an update process, electronically building one or more processing packages for the one or more order items based on the defined profile, and executing the availability check using the profile and one or more processing packages.

12 Claims, 12 Drawing Sheets

500

| Delivery Priority | Created on | Document Number | Item Number |
|---|---|---|---|
| 2 | 2004.05.11 | 40005393105 | 00010 |
| 1 | 2004.05.11 | 40005393104 | 00010 |
| 1 | 2004.05.05 | 40005393103 | 00010 |
| 2 | 2004.05.05 | 40005393102 | 00010 |
| 1 | 2004.05.11 | 40005393106 | 00010 |

| Delivery Priority | Created on | Document Number | Item Number |
|---|---|---|---|
| 1 | 2004.05.05 | 40005393103 | 00010 |
| | 2004.05.11 | 40005393104 | 00010 |
| | | 40005393106 | 00010 |
| 2 | 2004.05.05 | 40005393102 | 00010 |
| | 2004.05.11 | 40005393105 | 00010 |

SYSTEMS AND METHODS FOR AUTOMATED PARALLELIZATION OF BACK-ORDER PROCESSING

BACKGROUND OF THE INVENTION

I. Field of the Invention

The present invention generally relates to data processing systems and methods. More particularly, the invention relates to computerized systems and methods for automated parallelization of back-order processing in a supply chain environment.

II. Background Information

In a supply chain management (SCM) environment, a planning and optimization module may be used to plan and execute supply chain processes. The confirmation of quantities may be done through an available to promise (ATP) check. Along with a "first come-first served" principle of an ATP check, a user may have the possibility to redistribute confirmed quantities according to priorities and to override the results of the ATP check. The ATP check, also known as an availability check, ensures that a company can provide the requested product at the requested time in the quantity requested by the customer.

Back-order processing (BOP) is typically a function provided within ATP functionality that can check the availability of one or more products using a list of selected orders. By way of example, BOP planning may fulfill a basic request to SCM that consists of changing confirmed quantities. BOP can also be used for redistributing an available quantity of items.

Currently, technological solutions are available to help check if product quantities are available within a supply chain environment. However, existing BOP applications suffer from several drawbacks. For example, one main problem is that frequently high numbers of order lines have to be processed and, as a result, very long processing or run times are observed.

Accordingly, there is a need for improved systems and methods for automatically and more efficiently processing BOP checks, such as BOP checks in a supply chain environment.

SUMMARY OF THE INVENTION

Methods, systems, and articles of manufacture consistent with the present invention may check the availability of one or more order items using a list of selected orders within a warehouse. More particularly, methods, systems, and articles of manufacture consistent with the invention facilitate the automated parallelization of the availability check of one or more order items, for example, in a SCM system. As used herein, the term "availability check" is used as a synonym for BOP.

In accordance with one embodiment, a method for determining the availability of one or more order items within a supply chain environment is provided. The method may comprise defining a profile to be associated with an availability check, wherein the availability check consists of a filter process, a sort process, a prepare process, a check process, and an update process, electronically building one or more processing packages for the one or more order items based on the defined profile, and executing the availability check using the profile and one or more processing packages.

Consistent with another embodiment, a system for determining the availability of one or more order items within a supply chain environment is provided. The system may comprise a component for defining a profile to be associated with an availability check, wherein the availability check consists of a filter process, a sort process, a prepare process, a check process, and an update process, a component for electronically building one or more processing packages for the one or more order items based on the defined profile, and a component for executing the availability check using the profile and one or more processing packages.

In yet another embodiment, a computer-readable medium that stores a set of instructions which, when executed, performs a method for determining the availability of one or more order items within a supply chain environment is provided. The method may comprise defining a profile to be associated with an availability check, wherein the availability check consists of a filter process, a sort process, a prepare process, a check process, and an update process, electronically building one or more processing packages for the one or more order items based on the defined profile, and executing the availability check using the profile and one or more processing packages.

Additional aspects of the invention are set forth in the detailed description that follows or may be learned by practice of methods, systems, and articles of manufacture consistent with the present invention. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several aspects of the invention and, together with the description, serve to explain the principles of the invention. In the drawings:

FIGS. 5A and 5B illustrate two exemplary tables of order items, consistent with an embodiment of the present invention;

DETAILED DESCRIPTION

Figure 1A:
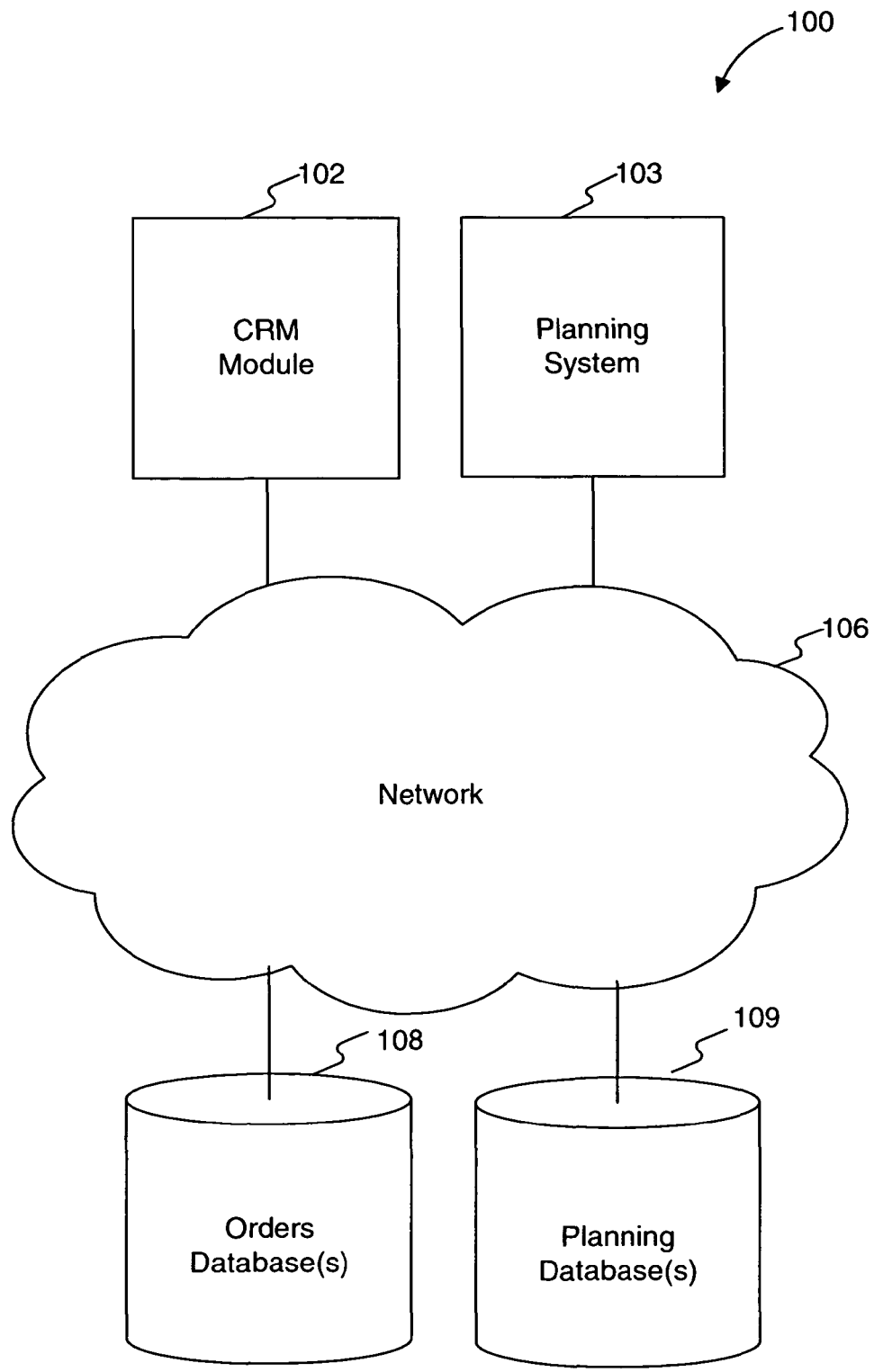
FIG. 1A depicts an exemplary system environment, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1A depicts an exemplary system environment, consistent with an embodiment of the present invention. System 100 may contain a customer relationship management (CRM) Module 102, which may comprise a computer or network of computers for supporting customer requests and communications. In one embodiment, CRM Module 102 may be implemented as part of a larger CRM system. CRM Module 102 may receive customer orders and send information related to the customer orders to a planning system 103 through a network 106. Network 106 can be any data communications network including any combination of networks, such as the Internet, corporate Intranets, a local area network, and other networks compatible with a networking protocol, such as TCP/IP. Planning system 103 may be a computer or network of computers that may, optionally, receive order item information from CRM Module 102 and, in response, check the availability of the one or more items in any location, for example a warehouse, a distribution center, or a manufacturing plant.

As shown in FIG. 1A, system 100 may also include one or more database(s) 108 and 109. Each database in system 100 may include information that can be accessed through a database protocol, such as, in one embodiment, Structured Query Language (SQL). Orders database 108 may be a database or set of databases accessed by CRM Module 102 through network 106. Orders database 108 may store any information related to the order and order items gathered by CRM Module 102. Planning database 109 may also be may be a database or set of databases accessed by Planning System 103 through network 106. Planning database 109 may store any information related to orders and order items processed by Planning system 103. As used herein, the term "order item" refers to any product or good a customer can purchase and is also stored in a warehouse or other facility. By way of example, an order item may comprise a part for manufacturing, a finished product, or a part used to provide a service to a customer. An order item may also comprise a commercial product, such as a book, an office supply, an article of clothing, an electronic device, a home appliance, or any other type of merchandise. By way of further example, in the context of a warehouse environment for an automotive or machinery supplier, an order item may comprise an automotive part, an engine part, or a heavy equipment part and the like. Moreover, as used herein, the term "order" refers to one or more order items.

This information could be, but is not limited to, the order type, the product (the actual item being delivered), the product group, the product hierarchy, the distribution center where a product is located, the area where a particular product is located, the plant where a product is located, the location hierarchy of a product, the customer associated with each product, the customer type, the item category (indicating, e.g., how the product should be delivered), the date and time an order item was created, the quantities of each item in the order, the requested delivery dates and times of the item, the confirmed quantities and dates and times of each item, the availability dates (e.g., the date the product is or has to be available at the source location to be delivered to the customer at the confirmed delivery date; it may be calculated by taking the delivery time minus the goods receipt processing time), the order number, and/or the shipping destination of each item. Orders database 108 may store a complete data structure with all or any combination of the data identified above for each order item.

Figure 1B:
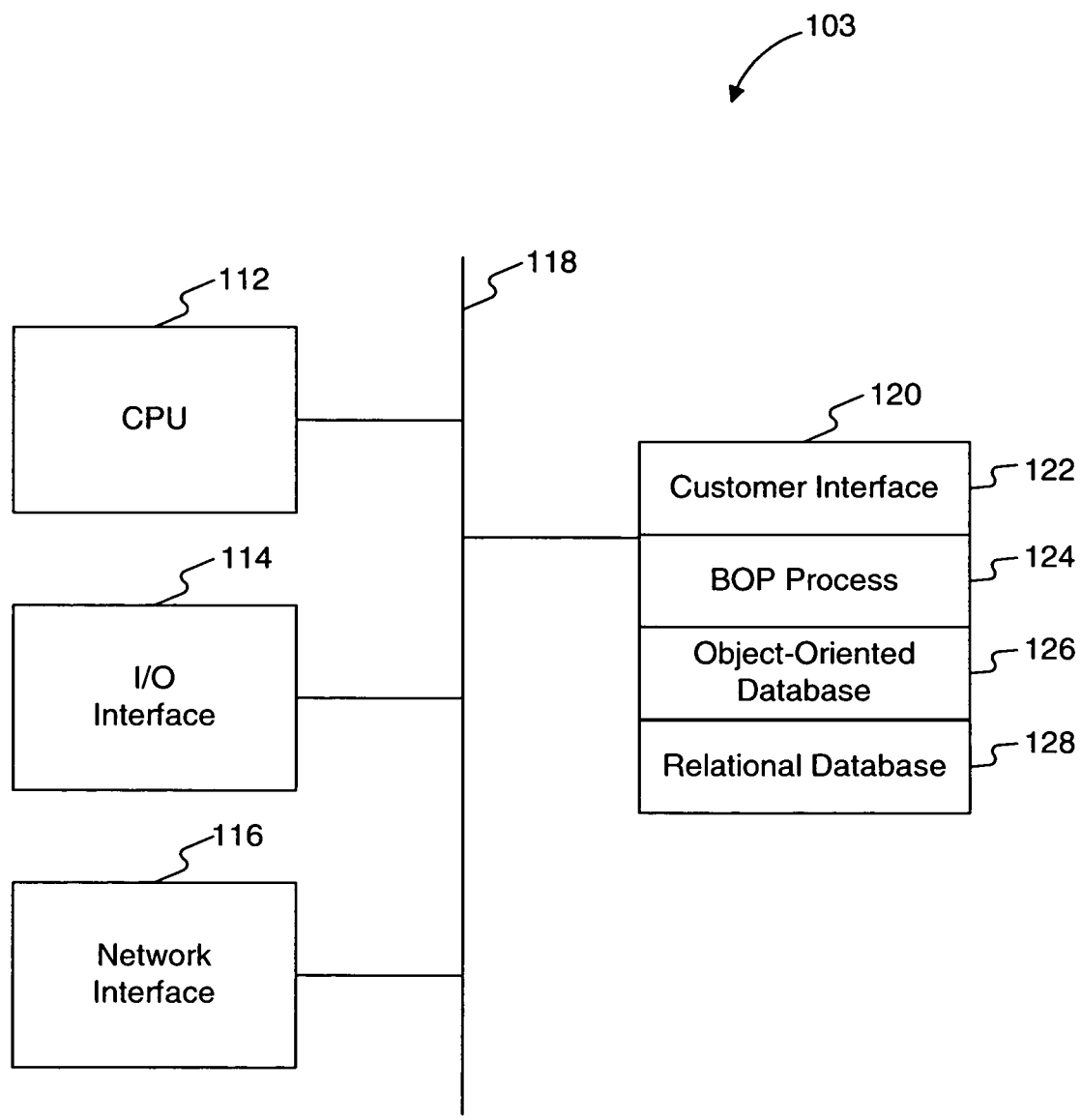
FIG. 1B is a block diagram of an exemplary planning system, consistent with an embodiment of the present invention.

FIG. 1B is a block diagram of an exemplary planning system 103, consistent with an embodiment of the present invention. Planning system 103 may include at least one central processing unit (CPU) 112, an I/O interface 114, a network interface 116, and memory 120. CPU 112 may execute instructions associated with the processes contained in memory 120 and transmit results to other subsystems of planning system 103 over a high-speed interconnect or data bus 118. I/O interface 114 is an interface that may be used to couple planning system 103 to devices such as a keyboard, a mouse, a display device, and any other I/O device useful in operating and planning system 103, as is understood by one of skill in the art. The network interface 116 may be used to communicate with network 106 (FIG. 1A).

In one embodiment, memory 120 may include customer interface process 122, which may have program instructions that, when executed, receive order item information from CRM Module 102 (FIG. 1A). Memory 120 may also store a BOP process 124, which may comprise program instructions that, when executed, can check the availability of one or more order items in a warehouse. In one exemplary embodiment, planning system 103 or components thereof may be a planning system, such as the Advanced Planner & Optimizer (APO) available from SAP AG (Walldorf, Germany).

Memory 120 may also store an object-oriented database 126 and a relational database 128. All planning logistical orders may be stored in a network in object-oriented database 126. In the object-oriented database 126 (also referred to as LiveCache) only the logistical planning relevant data (especially product, locations, quantities and dates) are stored. The network may describe the dependencies between the different order items (e.g., a production order has to be finished to be able to confirm and to deliver a sales order item). Relational database 128 may store any information related to the order items received from CRM Module 102. The relational database may also contain all additional business relevant data.

Figure 2:
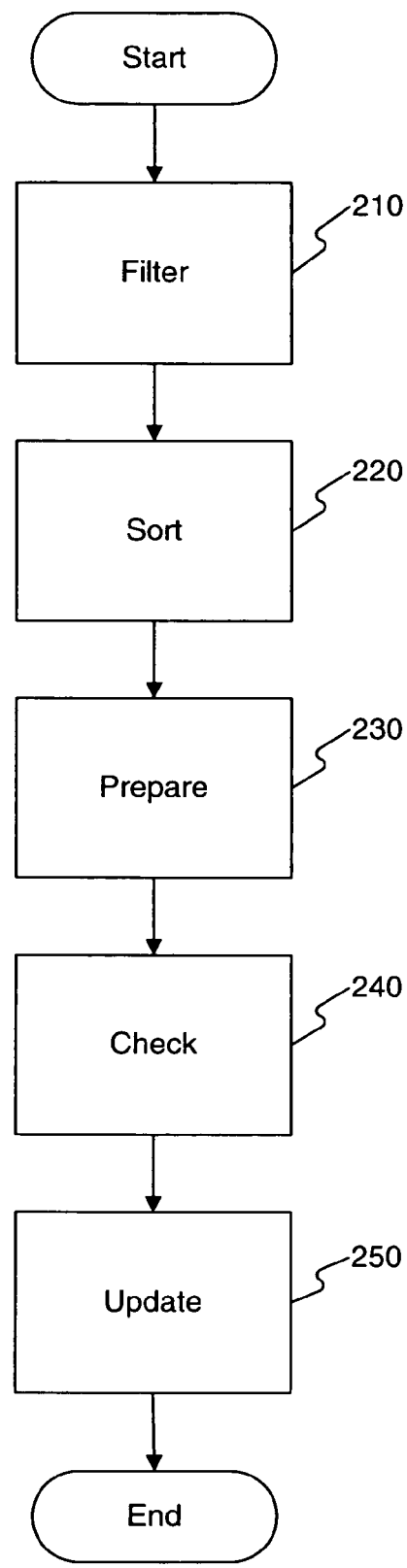
FIG. 2 is a flowchart of an exemplary method for executing the availability check of one or more items using a list of orders, consistent with an embodiment of the present invention.

FIG. 2 is a flowchart of an exemplary method for executing the availability check of one or more order items using a list of orders, consistent with an embodiment of the present invention. During a filter process, the order items that a user of planning system 103 may want to include in back-order processing are selected using characteristic values that a user has defined in a filter variant. In one embodiment, a user defines which order categories should be taken into account and which characteristics should be used for the filtering.

Customer interface process 122 may be executed by CPU 112 for receiving the list of orders from CRM Module 102. After receiving a list of orders consisting of one or more order items from CRM Module 102, a user of planning system 103 may first filter the order items in the orders received (stage 210). BOP process 124 may be executed by CPU 112 for filtering the order items, as described below.

At least one filter type may be set up by the user of planning system 103. In one embodiment, a filter type includes a name for identification purposes and any of the following criteria: order type, product, product group, product hierarchy, distribution center, a manufacturing resource planning (MRP) area, the plant where the order item is located, location hierarchy, customer that ordered the item, customer type, item type, and item created (i.e., date and time the order item was created or the number of days before the current day). In the filter variant (described below), a horizon in days can be specified (instead of a concrete date). This allows the user to create one filter variant, which can be used periodically to select the orders created in the last, e.g., 10 days. If it would be possible to specify the concrete date only, the filter variant may have to be adapted manually before any execution, to get the same behavior. Also, the requested delivery date and the availability date can be specified in the filter concrete of as a horizon (which is always based on the current day). Depending on the type of date, it is calculated forward or backward). The filter may also include one or more the following criteria: requested quantity, requested delivery as date and time or as number of days from when order was placed, confirmed quantity, availability date as date and time or as number of days, and/or the delay of confirmation (e.g., the difference between the requested and the confirmed delivery date).

A filter variant may be defined that contains the values of the criteria for the selection of the order items. Several variants can be defined for each filter type. For each variant, a user may specify a specific value for an order, a pattern (e.g., all order items with products starting with "A"), or a range (e.g., all order items placed between dates between "2004.05.05" and "2004.05.11"). In one embodiment, a user may also set up multiple variants for one filter type.

To set up a filter type, one or more user interfaces (e.g., GUIs) may be provided. Such an interface may include, for example, entry fields and control buttons for entering information. In one embodiment, a GUI is provided with message prompts, entry fields, and/or control buttons to facilitate the creation of a filter type by a user. Such a GUI may comprise one or more screens or windows to guide a user through the process of creating a filter type. Help screens may provide information to the user, and/or drop-down menus or tables may provide lists of predefined services, profiles, or other elements for selection by the user when creating a filter type. Additionally, or alternatively, a filter type may be created using a separate application or program and then stored for later access by the planning system 103. Other types of input means may be used as well to set up a filter type.

Figure 3:
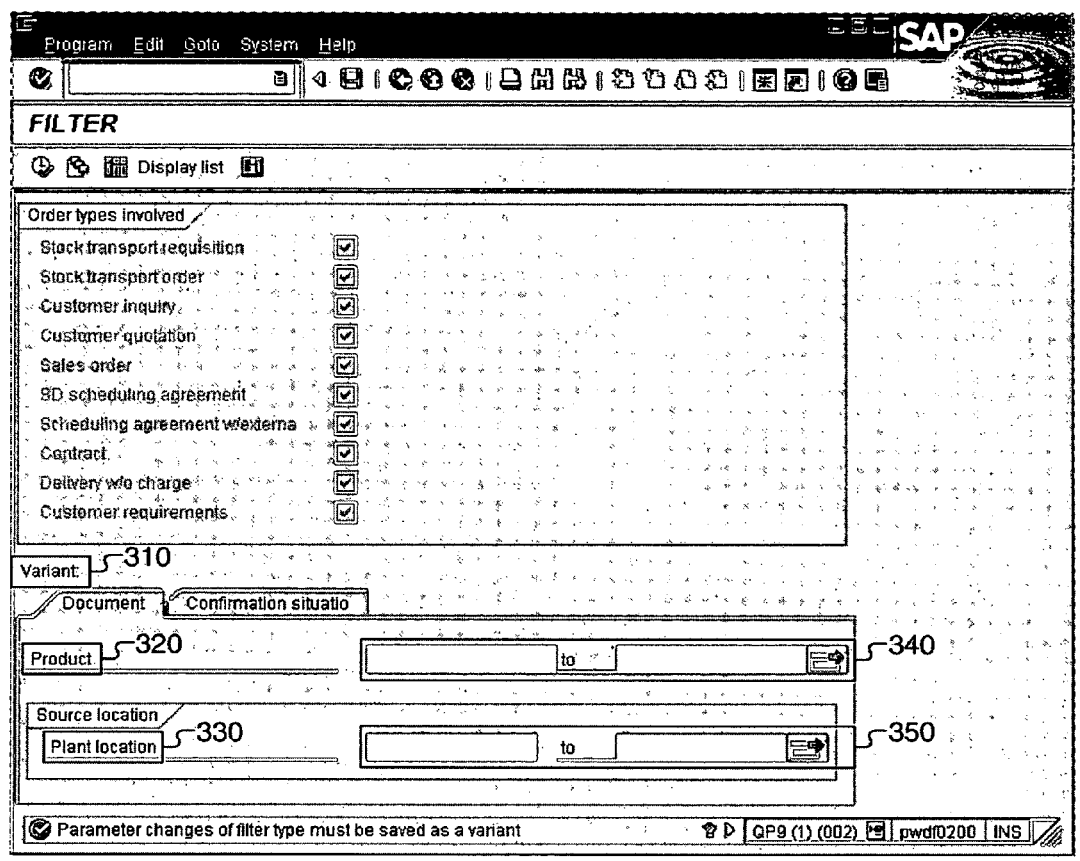
FIG. 3 is an exemplary graphical user interface (GUI) that may be used to set up a filter type, consistent with an embodiment of the present invention.

FIG. 3 is an exemplary GUI that may be used to set up a filter type, consistent with an embodiment of the present invention. As shown in FIG. 3, the user may set up one or more variants 310 for each filter type. For example, in FIG. 3, the user may set up a filter type for "product" 320 and one for "plant location" 330. In this example, the user may set up a range 340 associated with "product" 320 and a range 350 associated with "plant location" 330. A range 340 associated with "product" 320 may be all products with numbers between "1000 and 9999," and a range 350 associated with "plant location" 330 may be all locations with numbers between "0001 and 0009," or all locations which names start with "PL" (i.e., PL*).

Once the filter type has been set up, BOP process 124 (FIG. 1B) may run each of the order items through the filter type during the filter process. If more than one filter is used, the result of all the filters lists are merged (set union) in one single work list for the BOP process. The first part of the filter process may consist of BOP process 124 reading the order items from the object-oriented database 126. To select the order items from the object-oriented database 126, only logistical criteria can be used because of the logistical focusing of the object-oriented database 126. These are criteria, such as order category, product, product group, product hierarchy, distribution center, MRP area, plant, and location hierarchy. In the second part of the filter process, the data of the order items found in the first part may be read from relational database 128. In this stage, each order item is checked against criteria, such as customer, customer type, item type, item created (as date and time or number of days), requested quantity, requested delivery as date and time or as number of days, confirmed quantity, availability date as date and time or as number of days, and the delay of confirmation.

Any item matching the filter type becomes part of a worklist and may move to the next step (220) in the BOP process 124. As used herein, the term "worklist" is a list of order items that are to be handled by the BOP process 124. BOP process 124 may then sort each of the items in the worklist (FIG. 2, stage 220). Sorting the order items defines the priority of each order item. In one embodiment, order items given a higher priority can be, for example, items that have the highest probability to get quantity fulfilled or confirmed. The priority given to each order item may determine the sequence each item is processed by BOP process 124 from this point onward. In one embodiment, a sort profile may be defined by the user of planning system 103 that describes which criteria should be used to sort each order item. According to one embodiment, the sort profile may have a name to identify it and may be associated with any of the following criteria: order type, category, item type, order number, item number, schedule line number, customer, customer type, plant, product priority, delivery priority, order priority, correlation group, items created at, requested quantity, delivery date, confirmed quantity, confirmation proportion, and/or number of partial schedule lines.

In accordance with an embodiment, the sequence of the criteria in the sort profile may define the weight of each criteria. For example, criteria entered first into the sort profile may have a higher weight. Therefore, if the sort profile consists of "order type" and "item created" in this order, the list of order items is first sorted by the "order type," because "order type" appeared ahead of "item created" in the sort profile. Then all the items with the same "order type" may be sorted by the "item created" criteria.

To set up a sort profile, one or more user interfaces (e.g., GUIs) may be provided. Such an interface may include, for example, entry fields and control buttons for entering information. In one embodiment, a GUI is provided with message prompts, entry fields, and/or control buttons to facilitate the creation of a sort profile by a user. Such a GUI may comprise one or more screens or windows to guide a user through the process of creating a sort profile. Help screens may provide information to the user, and/or drop-down menus or tables may provide lists of predefined services, profiles, or other elements for selection by the user when creating a sort profile. Additionally, or alternatively, a sort profile may be created using a separate application or program and then stored for later access by the planning system 103.

Figure 4:
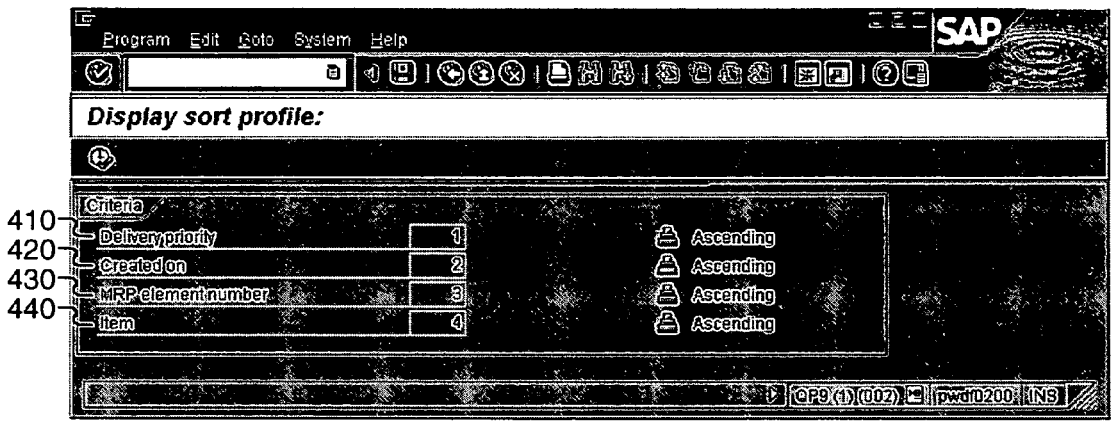
FIG. 4 is an exemplary GUI that may be used to set up a sort profile, consistent with an embodiment of the present invention.

FIG. 4 is an exemplary GUI that may be used to set up a sort profile, consistent with an embodiment of the present invention. The exemplary sort profile of FIG. 4 is defined with criteria of "delivery priority" 410, "created on" 420, "MRP element number" 430, and "item" 440. If in this example, five order items came through the filter in stage 210 and were sorted in stage 220 (as shown in FIG. 2), the result of the sort may be one or more tables.

By way of example, FIGS. 5A and 5B illustrate two exemplary tables of order items, consistent with an embodiment of the present invention. In FIG. 5A, table 500 reflects order items after they are filtered by BOP process 124 in stage 210 and that are now ready to be sorted by BOP process 124. In FIG. 5B, table 502 represents a table of order items after they have been through the sort process. In particular, table 500 shows five order items 510, 520, 530, 540, and 550 and each have a "delivery priority," "created on," "document number," and "item number" attribute associated with each of them. Each of these order items may be sorted according to a sort profile, such as that represented in the example of FIG. 4. In the sort profile of FIG. 4, the first criteria was "delivery priority" 410. As a result, BOP process 124 may first sort the order items by the "delivery priority" 410. The five order items in table 502 only have two different delivery priorities; specifically the items have a "delivery priority" of "1" 560, or "2" 570. Therefore, the list is first sorted by "delivery priority" as shown in table 502. Once the list is sorted by "delivery priority," the sort profile in FIG. 4 specifies that the next criteria to sort by is "created on" 420. Therefore, BOP process 124 may sort the items by the "created on" 420 criteria of each item. The sort sequence of the "created on" 420 is dependent on the "delivery priority" 410 sort. Therefore, all order items of "delivery priority" "1" may be sorted by the "created on" criteria, and then the order items of "delivery priority" "2" may be sorted by the "created on" criteria. After the items are sorted by "created on" 420, they may then be sorted by "MRP element number" 430, and finally by "item" 440. Table 502 illustrates the items in table 500 after they have been fully sorted by BOP process 124.

BOP process 124 may then prepare the order items in the worklist before each order item is sent to the ATP check, where the availability of each order item in the worklist is checked (cf. FIG. 2, stage 230). In the prepare stage, each order item in the worklist is processed to determine scheduling of the order item. BOP process 124 may calculate, based on the requested delivery date of the order item, the availability date of each item in the worklist. The availability date may be the date and time when the product has to be available at the delivery location to arrive at the customer location on time.

After each item in the worklist has been prepared to determine the availability date of each order item in stage 230, BOP process 124 may then check the availability of each order item in the worklist based on the availability date (stage 240). In this stage, BOP process 124 may check to determine whether each order item in the worklist is available to send to customers by the availability date.

Finally, BOP process 124 may run an "update" on each order item after the availability check of each item has been confirmed in stage 240 (stage 250). BOP process 124 may send the results of the availability check of stage 240 back to CRM Module 102. Orders database 108 may then be updated so that the data structure corresponding to each order item is updated with any new information, such as whether a particular item is not available to a customer on the date promised. The confirmation results contain information regarding whether the requested product is available. In the case it is available, the confirmation can consist of one or several quantities and dates (when the requested product and quantity will be delivered to the customer in one or several eventually partial deliveries). The confirmation information can also contain alternative products and/or alternative source locations, which are delivered instead of the requested product. Alternative products are used for business related reasons such as e.g., closed plants, or unavailable or old products. The alternative products may be chosen as a part of the availability check (executed in the check process) and is independent from BOP or its parallelization.

Figure 6:
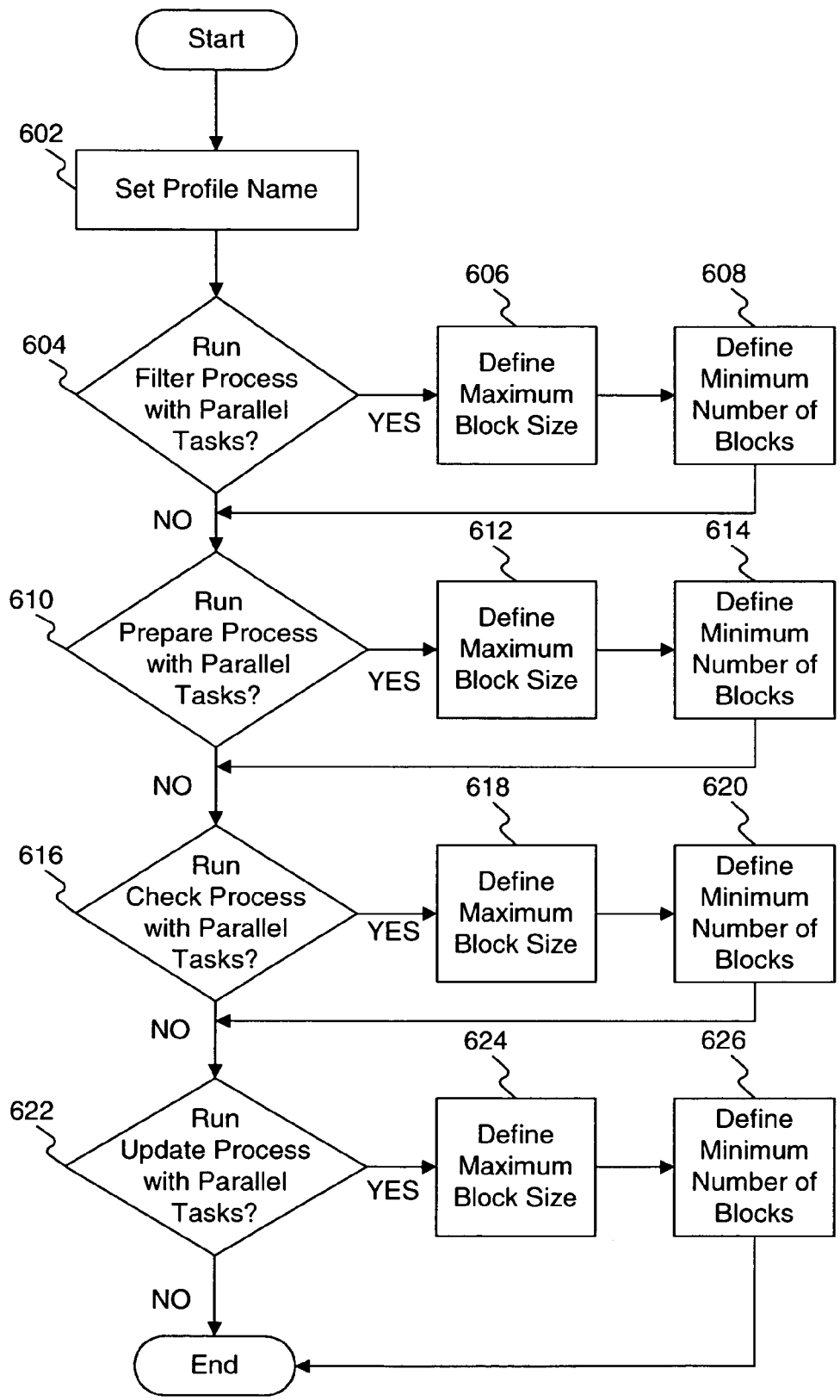
FIG. 6 is a flowchart of an exemplary method for creating a BOP profile to perform automated parallelization of BOP, consistent with an embodiment of the present invention.

Consistent with an aspect of the invention, planning system 103 may execute one or more stages of BOP parallel tasks. In order to execute the one or more stages in parallel, a user of planning system 103 may specify a processing profile to be associated with the execution of BOP (referred to as a "BOP profile" hereinafter). FIG. 6 is a flowchart of an exemplary method for creating a BOP profile to perform automated parallelization of BOP, consistent with an embodiment of the present invention. For purposes of illustration, the flowchart of FIG. 6 is described with reference to the exemplary planning system 103, as depicted in FIG. 1B. It will be appreciated, however, by those skilled in the art that the method of FIG. 6 is not limited to use with planning system 103 and may be used in other planning environments, consistent with the present invention.

A user may first designate a profile name to be associated with the BOP profile (stage 602). This may be achieved through a GUI or other input means.

Once the user has designated a profile name, the user may then determine whether to set parameters to run the filter process of BOP with parallel tasks (stage 604). If the user determines that the filter process should be run with parallel tasks, where more than one filter process is executed at the same time by BOP process 124 in planning system 103, the user then define the maximum package size to be associated with the filter process (stage 606). In one embodiment, the maximum package size represents the maximum number of order items that may be in one filter process task, i.e., the package size, executed by BOP process 124. The number of order items may be divided by this to get the number of filter process tasks. Each filter process task corresponds to one package.

Once the maximum package size has been defined, the user may set the minimum number of packages (stage 608). The minimum number of packages represents the minimum number of packages that must exist before each package is run through the filter process in parallel.

Additionally, or optionally, the user may set the minimum package size for the filter process (i.e., the minimum number of order items that are to be grouped into one package). If one package with less than this number of items remains, the size of the other packages is reduced to reach at least this minimum package size for the last package. If this goal cannot be reached (e.g., because the worklist is not large enough), then the minimum package size may be ignored by BOP process 124. Therefore, the last executed package may be smaller than the minimum package size.

The user may also optionally set the maximum number of filter process tasks. Therefore, the total number of filter process tasks BOP process 124 may run in parallel may be restricted by this number. For example, if "10" processes can be run at the same time in parallel in planning system 103, the user may restrict how many of those processes are filter processes by setting the maximum number of filter process tasks. This setting may be useful if several jobs (BOP and other planning tools) use the same server group to execute their tasks.

Once the user has designated a profile name and optionally set parallelization parameters for the filter process, the user may determine whether to set parameters to run the prepare process of BOP with parallel tasks (stage 610). If the user determines that the prepare process should be run with parallel tasks, where more than one prepare process is executed at the same time by BOP process 124 in planning system 103, the user may define the maximum package size to be associated with the prepare process (stage 612). In one embodiment, the maximum package size represents the maximum number of order items that may be in one prepare process, i.e., the package size, executed by BOP process 124. The number of order items may be divided by this to get the number of prepare process tasks. Each prepare process task corresponds to one package.

Once the maximum package size has been defined, the user may set the minimum number of packages (stage 614). The minimum number of packages represents the minimum number of packages that must exist before each package is run through the prepare process in parallel.

Additionally, or optionally, the user may set the minimum package size for the prepare process (i.e., the minimum number of order items that are to be grouped into one package). If one package with less than this number of items remains, the size of the other packages is reduced to reach at least this minimum package size for the last package. If this goal cannot be reached (e.g., because the worklist is not large enough), then the minimum package size may be ignored by BOP process 124. Therefore, the last executed package may be smaller than the minimum package size.

The user may also optionally set the maximum number of prepare process tasks. Therefore, the total number of prepare process tasks BOP process 124 may execute in parallel may be restricted by this number. For example, if "10" processes can be executed at the same time in parallel in planning system 103, the user may restrict how many of those processes are prepare processes by setting the maximum number of prepare process tasks. This setting may be useful if several jobs (BOP and other planning tools) use the same server group to execute their tasks.

The user may also optionally set parallelization parameters to run the check process of BOP with parallel tasks (stage 616). If the user determines that the check process should be run with parallel tasks, where more than one check process is executed at the same time by BOP process 124 in planning system 103, the user may define the maximum package size to be associated with the check process (stage 618). In one embodiment, the maximum package size represents the maximum number of order items that may be in one check process, i.e., the package size, executed by BOP process 124. The number of order items may be divided by this to get the number of check process tasks. Each check process task corresponds to one package.

As shown in FIG. 6, the user may also set the minimum number of packages (stage 620). The minimum number of packages represents the minimum number of packages that must exist before each package is run through the check process in parallel.

Additionally, or optionally, the user may also optionally set the minimum package size for the check process (i.e., the minimum number of order items that are to be grouped into one package). If one package with less than this number of items remains, the size of the other packages is reduced to reach at least this minimum package size for the last package. If this goal cannot be reached (e.g., because the worklist is not large enough), then the minimum package size may be ignored by BOP process 124. Therefore, the last executed package may be smaller than the minimum package size.

The user may also optionally set the maximum number of check process tasks. Therefore, the total number of check process tasks BOP process 124 may execute in parallel may be restricted by this number. For example, if "10" processes can be executed at the same time in parallel in planning system 103, the user may restrict how many of those processes are check processes by setting the maximum number of check process tasks. This setting may be useful if several jobs (BOP and other planning tools) use the same server group to execute their tasks.

As further illustrated in the example of FIG. 6, the user may also determine whether to run the update process of BOP with parallel tasks (stage 622). If the user determines that the update process should be run with parallel tasks, where more than one update process is executed at the same time by BOP process 124 in planning system 103, the user may then define the maximum package size to be associated with the update process (stage 624). In one embodiment, the maximum package size represents the maximum number of order items that may be in one update process, i.e., the package size, executed by BOP process 124. The number of order items may be divided by this to get the number of update process tasks. Each update process task corresponds to one package.

Once the maximum package size has been defined, the user may set the minimum number of packages (stage 626). The minimum number of packages represents the minimum number of packages that must exist before each package is run through the update process in parallel.

Additionally or optionally, the user may set the minimum package size for the update process (i.e., the minimum number of order items that are to be grouped into one package). If one package with less than this number of items remains, the size of the other packages is reduced to reach at least this minimum package size for the last package. If this goal cannot be reached (e.g., because the worklist is not large enough), then the minimum package size may be ignored by BOP process 124. Therefore, the last executed package may be smaller than the minimum package size.

The user may also optionally set the maximum number of update process tasks. Therefore, the total number of update process tasks BOP process 124 may execute in parallel may be restricted by this number. For example, if "10" processes can be executed at the same time in parallel in planning system 103, the user may restrict how many of those processes are update processes by setting the maximum number of update process tasks. This setting may be useful if several jobs (BOP and other planning tools) use the same server group to execute their tasks. The BOP profile created by the user may then be saved, such as in planning database 109 (cf. FIG. 1A).

To create a BOP profile, one or more user interfaces (e.g., GUIs) may be provided. Such an interface may include, for example, entry fields and control buttons for entering information. In one embodiment, a GUI is provided with message prompts, entry fields, and/or control buttons to facilitate the creation of the BOP profile by a user. Such a GUI may comprise one or more screens or windows to guide a user through the process of creating a BOP profile. Help screens may provide information to the user, and/or drop-down menus or tables may provide lists of predefined services, profiles, or other elements for selection by the user when creating a BOP profile. Additionally, or alternatively, BOP profiles may be created using a separate application or program and then stored for later access by the planning system 103.

Figure 7:
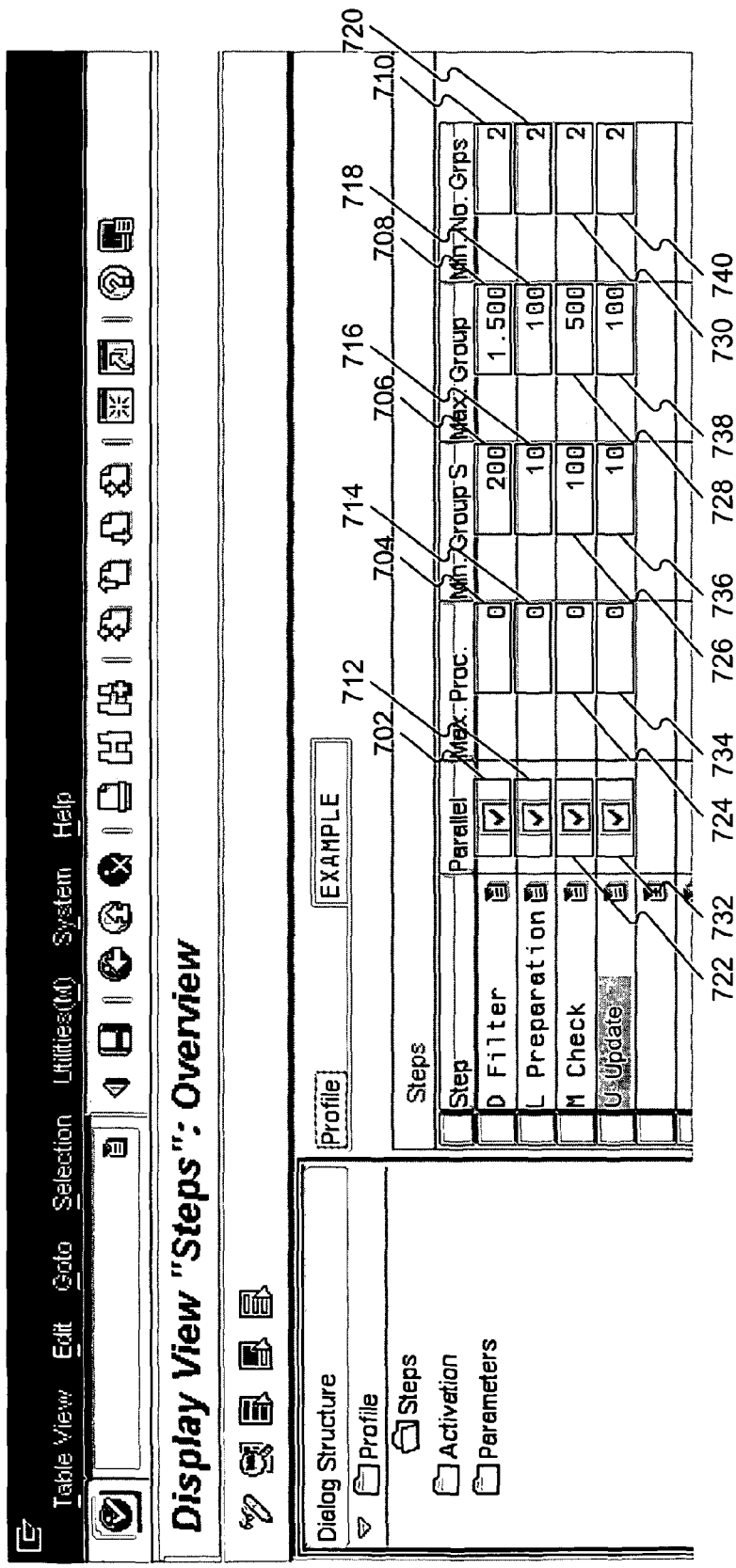
FIG. 7 is an exemplary GUI that may be used to set up a BOP profile, consistent with an embodiment of the present invention.

FIG. 7 is an exemplary GUI that may be used to set up a BOP profile, consistent with an embodiment of the present invention. As described above, a user may specify whether to run the filter process in parallel (702) and define the maximum package size (708), minimum number of packages (710), and optionally the maximum number of filter processes (704) and the minimum package size (706). Furthermore, a user may specify whether to run the prepare process in parallel (712) and set the maximum package size (718), minimum number of packages (720), and optionally the maximum number of prepare processes (714) and the minimum package size (716). Additionally, a user may specify whether to run the check process in parallel (722) and set the maximum package size (728), minimum number of packages (730), and optionally the maximum number of check processes (724) and the minimum package size (726). Finally, a user may specify whether to run the update process in parallel (732) and indicate the maximum package size (738), minimum number of packages (740), and optionally the maximum number of check processes (734) and the minimum package size (736).

Figure 8:
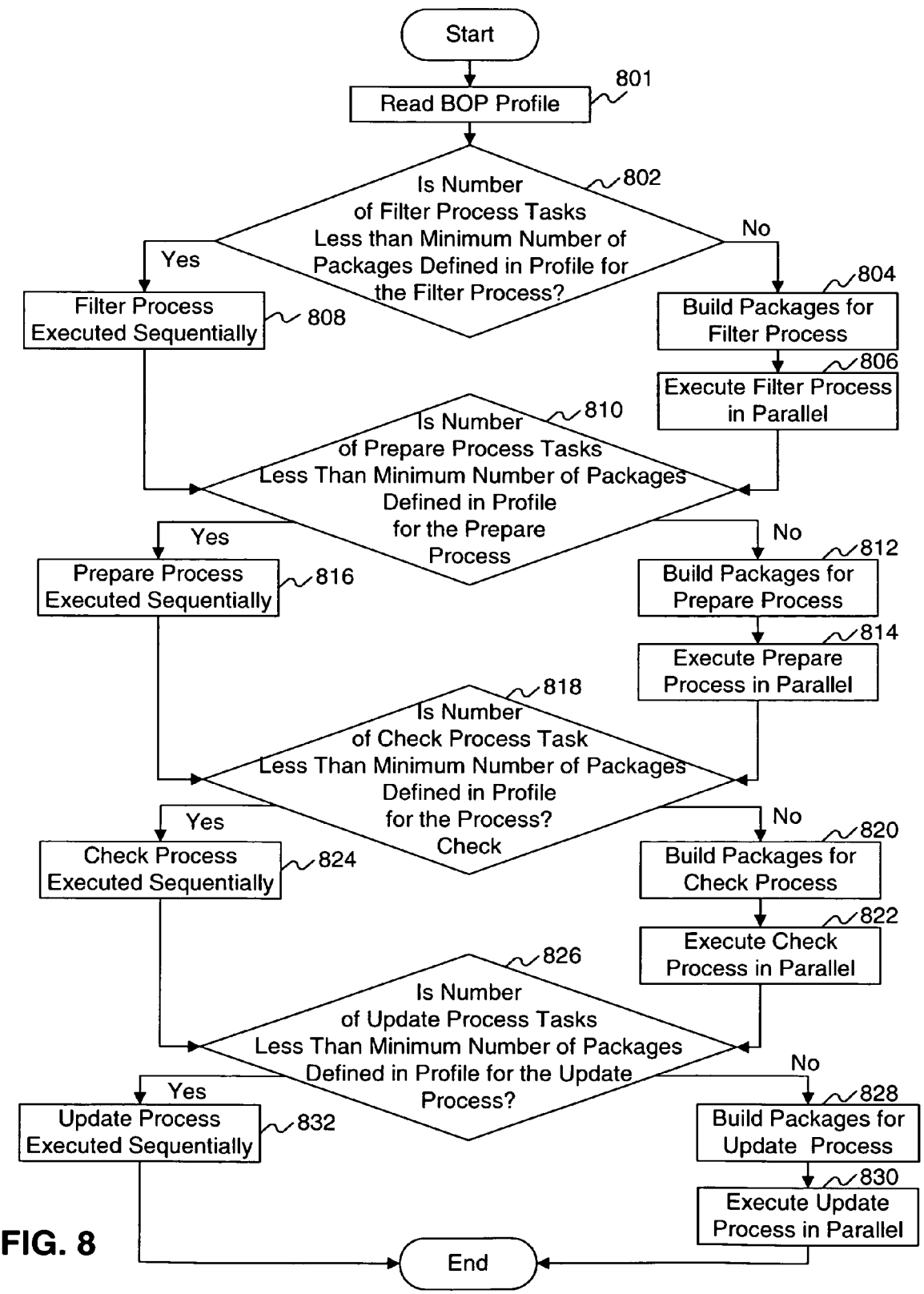
FIG. 8 is an flowchart of an exemplary method for executing BOP in parallel, using a BOP profile.

FIG. 8 is an flowchart of an exemplary method for executing BOP in parallel using a BOP profile, such as a BOP profile created using the process of FIG. 6. BOP process 124 may first read the BOP profile (stage 801). BOP process 124 may then determine if the number of filter process tasks, as determined using the maximum package size in stage 606 (cf. FIG. 6), is less than the minimum number of packages as set in stage 608 (cf. FIG. 6) (stage 802). If the number of filter process tasks is less than the minimum number of packages, then no parallel execution is started for the filter process. Therefore, even though the user may have chosen to run the filter process with parallel tasks in stage 604, the filter process may not be run with parallel tasks depending on the minimum number of packages, and each filter process task is processed sequentially (stage 808).

If the number of filter process tasks, as determined using the maximum package size in stage 606 (cf. FIG. 6), is not less than the minimum number of packages as set in stage 608 (cf. FIG. 6), then BOP process 124 may build one or more packages of the order items (stage 804) and may then execute the filter process in parallel for the one or more packages, using the BOP profile (stage 806).

BOP process 124 may then determine if the number of prepare process tasks, as determined using the maximum package size in stage 612 (cf. FIG. 6), is less than the minimum number of packages as set in stage 614 (cf. FIG. 6) (stage 810). If the number of prepare process tasks is less than the minimum number of packages, then no parallel execution is started for the prepare process. Therefore, even though the user may have chosen to run the prepare process with parallel tasks in stage 610 (cf. FIG. 6), the prepare process may not be run with parallel tasks depending on the minimum number of packages, and each prepare process task is processed sequentially (stage 816).

If the number of prepare process tasks, as determined using the maximum package size in stage 612 (cf. FIG. 6), is not less than the minimum number of packages as set in stage 614 (cf. FIG. 6), then BOP process 124 may use the BOP profile to build one or more packages of order items (stage 812) and may then execute the prepare process tasks in parallel for the one or more packages (stage 814).

BOP process 124 may then determine if the number of check process tasks, as determined using the maximum package size in stage 618 (cf. FIG. 6), is less than the minimum number of packages as set in stage 620 (cf. FIG. 6) (stage 818). If the number of check process tasks is less than the minimum number of packages, then no parallel execution is started for the check process. Therefore, even though the user may have chosen to run the check process with parallel tasks in stage 616 (cf. FIG. 6), the check process may not be run with parallel tasks depending on the minimum number of packages, and each check process task is processed sequentially (stage 824). In the check process, additional business related criteria may be evaluated for the creation of the packages. This step may overwrite the maximum and minimum package size as set by the user. All order items requesting the same product from the same location may have to be in one package. There may exist up to six more criteria which may be evaluated in the check process. One of these criteria may be the delivery group. A delivery group consists of items that should arrive at the same date and time to the customer. All items in a delivery may have to be in the same package for the check process. If a resulting package is smaller than the minimum package size, the package is combined with other packages until the minimum package size is reached.

If the number of check process tasks, as determined using the maximum package size in stage 618 (cf. FIG. 6), is not less than the minimum number of packages as set in stage 620 (cf. FIG. 6), then BOP process 124 may use the BOP profile to build one or more packages of order items (stage 820) and may then execute the check process tasks in parallel for the one or more packages (stage 822).

BOP process 124 may then determine if the number of update process tasks, as determined using the maximum package size in stage 624 (cf. FIG. 6), is less than the minimum number of packages as set in stage 626 (cf. FIG. 6) (stage 826). If the number of update process tasks is less than the minimum number of packages, then no parallel execution is started for the update process. Therefore, even though the user may have chosen to run the update process with parallel tasks in stage 622 (cf. FIG. 6), the update process may not be run with parallel tasks depending on the minimum number of packages, and each update process task is processed sequentially (stage 832).

If the number of update process tasks, as determined using the maximum package size in stage 624 (cf. FIG. 6), is not less than the minimum number of packages as set in stage 626 (cf. FIG. 6), then BOP process 124 may use the BOP profile to build one or more packages of order items (stage 828) and may then execute the update process in parallel for the one or more packages, using the BOP profile (stage 830).

In one embodiment, the user may, before or after creating the BOP profile, define a maximum number of processes that planning system 103 may run in parallel. This may be the total number of any process, for example, filter process, prepare process, check process, and/or update process, that can be executed in parallel by BOP process 124 in the planning system 103.

Figure 9A:
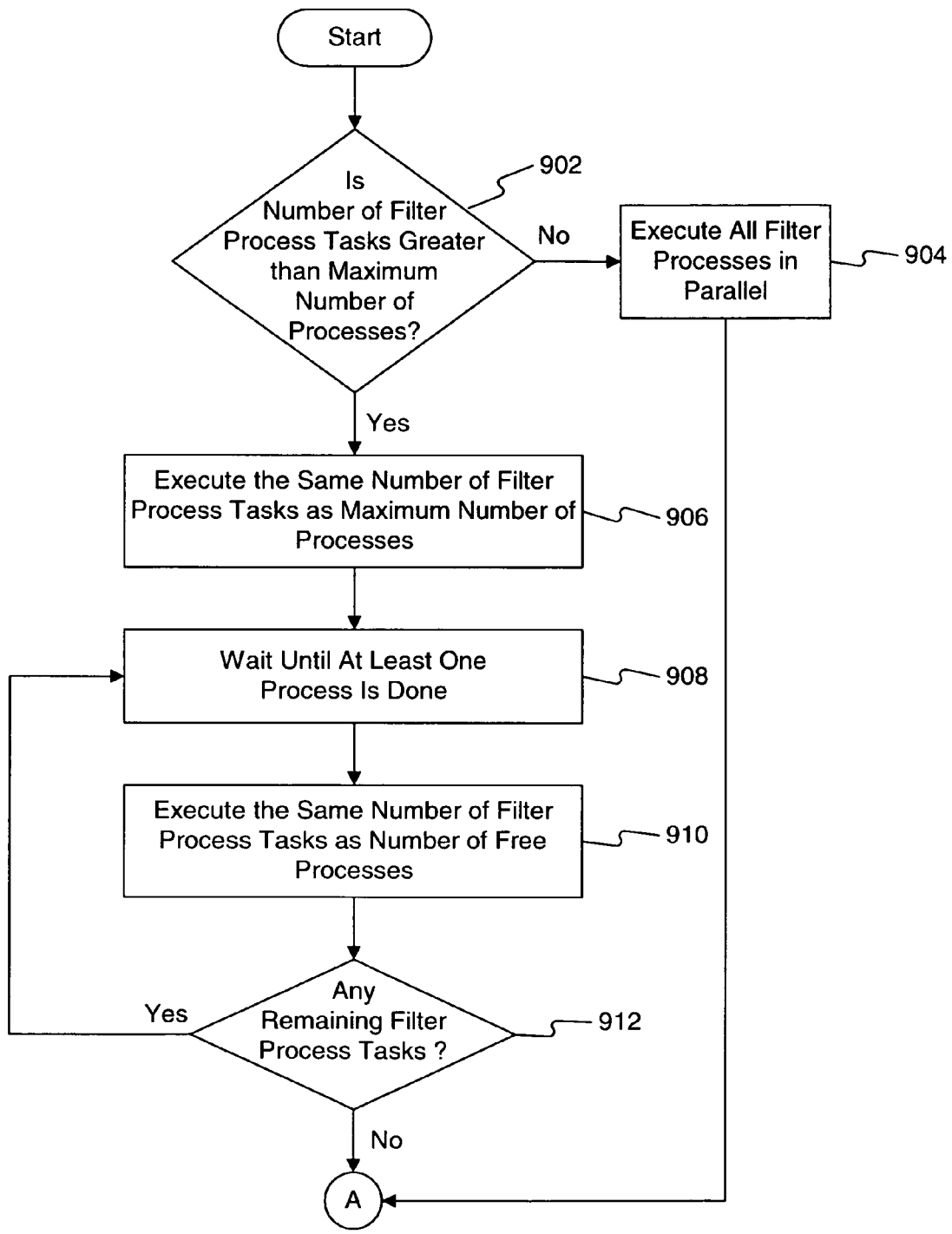
FIGS. 9A-9C are flowcharts of another exemplary method of executing BOP in parallel, using a BOP profile and a maximum number of processes.
Figure 9B:
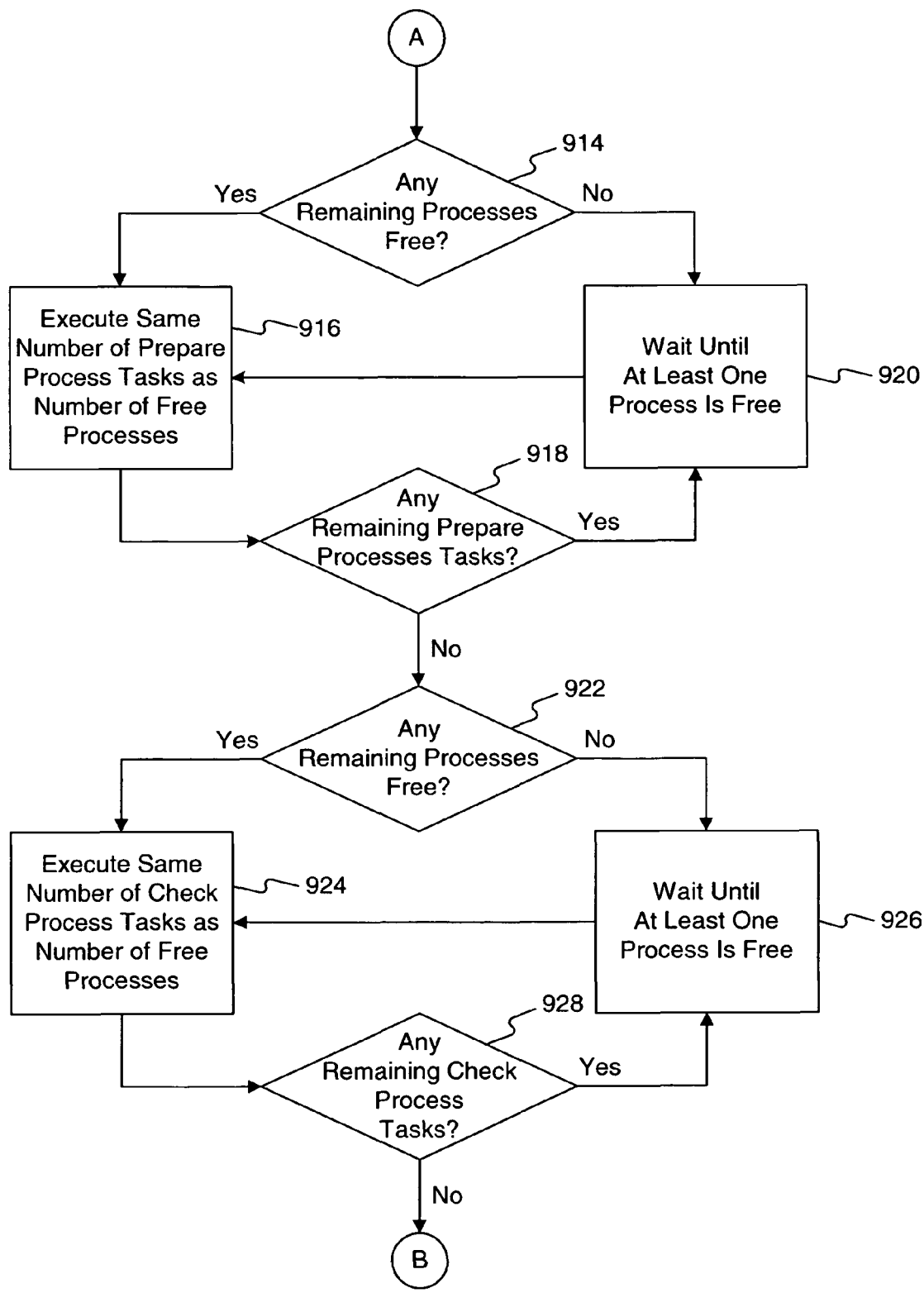
Figure 9C:
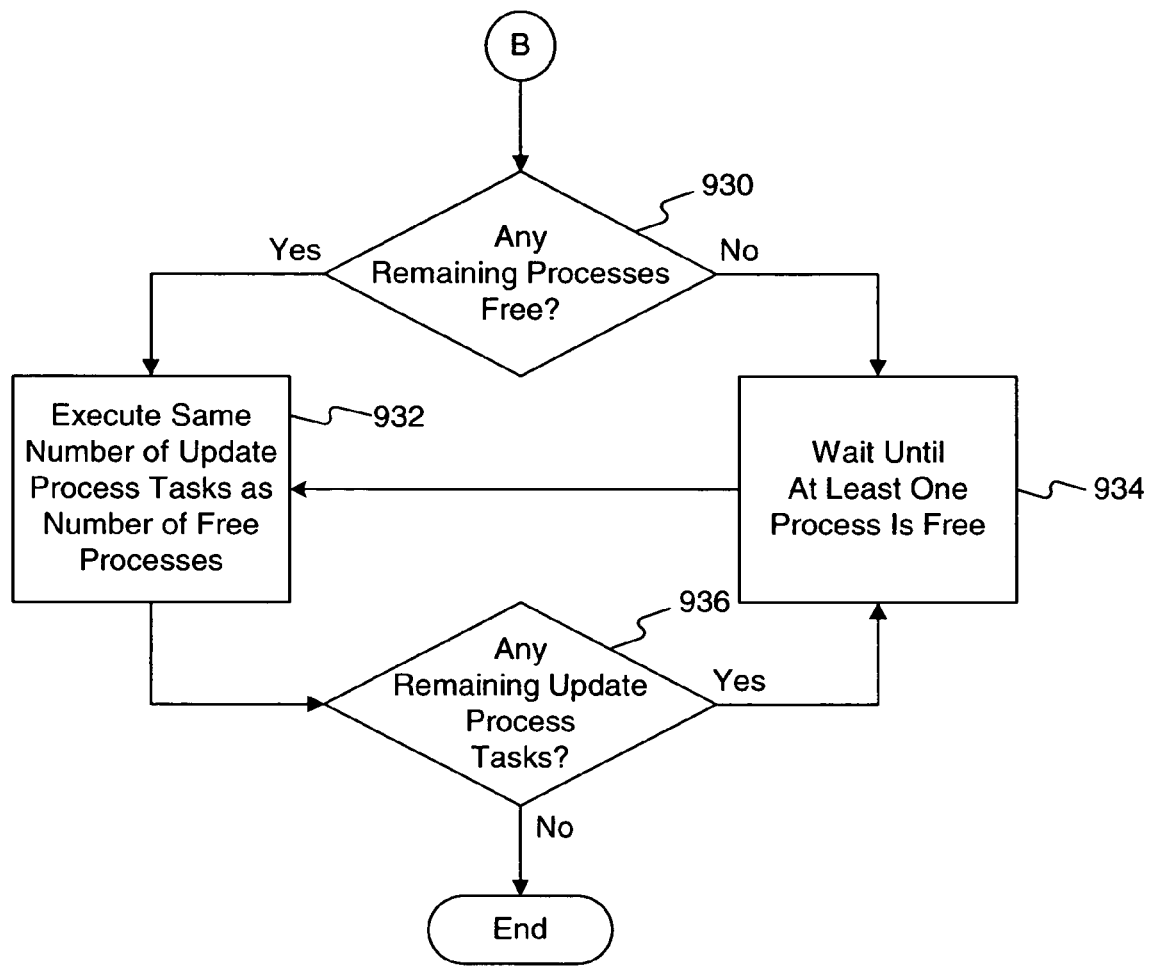

FIGS. 9A-9C are flowcharts of another exemplary method of executing BOP in parallel, using a BOP profile and a maximum number of processes. BOP process 124 may first determine whether the number of filter process tasks, as determined using the maximum package size in stage 612 (cf. FIG. 6), is greater than the maximum number of processes (stage 902). If the number of filter process tasks is not greater, BOP process 124 may execute all the filter process tasks in parallel (stage 904). If the number of filter process tasks is greater, then BOP process 124 may execute the same number of filter process tasks as the maximum number of processes (stage 906). BOP process 124 may then wait until at least one or more processes are finished (stage 908) and then execute the same number of filter process tasks as number of free processes (stage 910).

BOP process 124 may then determine whether any more filter process tasks remain (stage 912). If more filter process tasks remain, BOP process 124 may wait until at least one or more processes are finished (stage 908) and then execute the same number of filter process tasks as number of free processes (stage 910). If no more filter process tasks remain, BOP process 124 may then determine whether any remaining processes are free from the maximum number of processes (stage 914).

If no processes are free from the maximum number of processes as determined in stage 914, BOP process 124 may wait until at least one process is free (stage 920) and then execute the same number of prepare process tasks as the number of free processes (stage 916). If one or more processes are free from the maximum number of processes, BOP process 124 may execute the same number of prepare process tasks as the number of free processes (stage 916). BOP process 124 may then determine whether any prepare process tasks remain (stage 918). If any prepare process tasks remain, BOP process 124 may wait until at least one process is free (stage 920) and then execute the same number of prepare process tasks as the number of free processes (stage 916). If no prepare process tasks are left as determined in stage 918, then BOP process 124 may then determine whether any remaining processes are free from the maximum number of processes (stage 922).

If no processes are free from the maximum number of processes as determined in stage 922, BOP process 124 may wait until at least one process is free (stage 926) and then execute the same number of check process tasks as the number of free processes (stage 924). If one or more processes are free from the maximum number of processes, BOP process 124 may execute the same number of check process tasks as the number of free processes (stage 924). BOP process 124 may then determine whether any check process tasks remain (stage 928). If any check process tasks remain, BOP process 124 may wait until at least one process is free (stage 926) and then execute the same number of check process tasks as the number of free processes (stage 924). If no check process tasks are left as determined in stage 928, then BOP process 124 may then determine whether any remaining processes are free from the maximum number of processes (stage 930).

If no processes are free from the maximum number of processes as determined in stage 930, BOP process 124 may wait until at least one process is free (stage 934) and then execute the same number of update process tasks as the number of free processes (stage 932). If one or more processes are free from the maximum number of processes, BOP process 124 may execute the same number of update process tasks as the number of free processes (stage 932). BOP process 124 may then determine whether any update process tasks remain (stage 936). If any update process tasks remain, BOP process 124 may wait until at least one process is free (stage 934) and then execute the same number of update process tasks as the number of free processes (stage 934). If no update process tasks are left as determined in stage 936, then BOP process 124 has finished executing all processes for BOP.

In one embodiment, BOP process 124 may filter order items using the maximum package size (defined in stage 606, cf. FIG. 6), the minimum number of packages (defined in stage 608, cf. FIG. 6), as well as the maximum number of processes. For example, if BOP process 124 is to filter "50,000" order items with parallel tasks, and the user set the maximum package size as "50" (therefore the total number of filter process tasks is 50,000/50="1000") and the minimum number of packages as "3," and planning system 103 could only run "10" maximum processes in parallel, then BOP process 124 may execute "10" of the "1000" filter process tasks in parallel. These filter process tasks may be executed in parallel because the number of filter process tasks (1000) is not less than the minimum number of packages (3). If however, the user set the minimum number of packages as "1200," then the "1000" filter process tasks would not be executed in parallel and instead would be executed sequentially because the number of filter process tasks (1000) is less than the minimum number of packages (1200).

In another embodiment, BOP process 124 may prepare order items using the maximum package size (defined in stage 612, cf. FIG. 6), the minimum number of packages (defined in stage 614, cf. FIG. 6), as well as a maximum number of processes (described above). For example, if BOP process 124 is to prepare "1,000" order items with parallel tasks, and the user sets the maximum package size as "50" (i.e., the total number of prepare process tasks is 1,000/50="20") and the minimum number of packages as "3," and planning system 103 could only run "10" maximum processes in parallel, then BOP process 124 may execute "10" of the 20 prepare process tasks in parallel. These prepare process tasks may be executed in parallel because the number of prepare process tasks (20) is not less than the minimum number of packages (3). If however, the user sets the minimum number of packages as "120," then the "20" prepare process tasks would not be executed in parallel and, instead, would be executed sequentially because the number of prepare process tasks (50) is less than the minimum number of packages (120).

In another embodiment, BOP process 124 may check order items using the maximum package size (defined in stage 618, cf. FIG. 6), the minimum number of packages (defined in stage 620, cf. FIG. 6), as well as a maximum number of processes (described above). For example, if BOP process 124 is to check "1,000" order items with parallel tasks, and the user sets the maximum package size as "50" (i.e., the total number of check process tasks is 1,000/50="20") and the minimum number of packages as "3," and planning system 103 could only run "10" maximum processes in parallel, then BOP process 124 may execute "10" of the 20 check process tasks in parallel. These check process tasks may be executed in parallel because the number of check process tasks (20) is not less than the minimum number of packages (3). If, however, the user sets the minimum number of packages as "120," then the "20" check process tasks would not be executed in parallel and, instead, would be executed sequentially because the number of check process tasks (50) is less than the minimum number of packages (120).

In yet another embodiment, BOP process 124 may update order items using the maximum package size (defined in stage 624, cf. FIG. 6), the minimum number of packages (defined in stage 626, cf. FIG. 6), as well as a maximum number of processes (described above). For example, if BOP process 124 is to update "200" order items with parallel tasks, and the user sets the maximum package size as "50" (i.e., the total number of update process tasks is 200/50="4") and the minimum number of packages as "3," and planning system 103 could only run "3" maximum processes in parallel, then BOP process 124 may execute "3" of the "4" update process tasks in parallel. These update process tasks may be executed in parallel because the number of update process tasks (4) is not less than the minimum number of packages (3). If, however, the user sets the minimum number of packages as "6," then the "5" update process tasks would not be executed in parallel and, instead, would be executed sequentially because the number of update process tasks (5) is less than the minimum number of packages (6).

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed:

1. A computerized method for determining the availability of a plurality of order items within a supply chain environment, the method comprising:

defining a profile to be associated with an availability check, wherein the availability check includes at least one process, and wherein the profile comprises a package size parameter and a package number parameter associated with at least one process of the availability check;

electronically building processing packages for the plurality of order items to execute the at least one process, wherein the plurality of order items are divided among the processing packages based on the package size parameter of the defined profile; and executing the at least one process on the processing packages in parallel when the number of the processing packages exceeds the package number parameter.

2. The method of claim 1, wherein electronically building the processing packages comprises receiving a table of the plurality of order items, the table comprising availability information associated with each of the order items, and selecting the order items for each package based on the availability information and the profile.

3. The method of claim 1, wherein the at least one process includes a prepare process that comprises determining an availability date for each order item in the subset.

4. The method of claim 1, wherein the at least one process includes an update process that comprises updating a sales order to reflect the availability of each order item.

5. The method of claim 1, wherein the at least one process includes more than one filter process, more than one prepare process, more than one check process and more than one update process, and wherein defining the profile further comprises:

determining whether to execute more than one filter process at the same time;

determining whether to execute more than one prepare process at the same time;

determining whether to execute more than one check process at the same time; and determining whether to execute more than one update process at the same time.

6. A system for determining the availability of a plurality of order items within a supply chain environment, the system comprising:

a processor defining a profile to be associated with an availability check, wherein the availability check includes at least one process, and wherein the profile comprises a package size parameter and a package number parameter associated with at least one process of the availability check;

a processor electronically building processing packages for the plurality of order items to execute the at least one process, wherein the plurality of order items are divided among the processing packages based on the package size parameter of the defined profile; and a processor executing the at least one process on the processing packages in parallel when the number of the processing packages exceeds the package number parameter.

7. The system of claim 6, wherein electronically building processing packages comprises receiving a table of the plurality of order items, the table comprising availability information associated with each of the order items, and selecting the order items for each package based on the availability information and the profile.

8. The system of claim 6, wherein the at least one process includes a prepare process that comprises determining an availability date for each order item in the subset.

9. The system of claim 6, wherein the at least one process includes an update process that comprises updating a sales order to reflect the availability of each order item.

10. The system of claim 6, wherein the at least one process includes more than one filter process, more than one prepare process, more than one check process and more than one update process, and wherein defining the profile further comprises:

determining whether to execute more than one filter process at the same time;

determining whether to execute more than one prepare process at the same time;

determining whether to execute more than one check process at the same time; and determining whether to execute more than one update process at the same time.

11. A non-transitory computer-readable device that stores a set of instructions which, when executed, performs a method for determining the availability of a plurality of order items within a supply chain environment, the method comprising:

defining a profile to be associated with an availability check, wherein the availability check includes at least one process, and wherein the profile comprises a package size parameter and a package number parameter associated with at least one process of the availability check;

electronically building processing packages for the plurality of order items to execute the at least one process, wherein the plurality of order items are divided among the processing packages based on the package size parameter of the defined profile; and executing the at least one process on the processing packages in parallel when the number of the processing packages exceeds the package number parameter.

12. The non-transitory computer-readable device of claim 11, wherein electronically building processing packages comprises receiving a table of the plurality of order items, the table comprising availability information associated with each of the order items, and selecting the order items for each package based on the availability information and the profile.

* * * * *